United States Patent
Kim et al.

(10) Patent No.: US 8,168,328 B2
(45) Date of Patent: May 1, 2012

(54) SILICON THIN FILM ANODE FOR LITHIUM SECONDARY BATTERY AND PREPARATION METHOD THEREOF

(75) Inventors: Hyung-Sun Kim, Seoul (KR); Byung-Won Cho, Seoul (KR); Kyung-Yoon Chung, Seoul (KR); Joong-Kee Lee, Seoul (KR); Taeg-Kwan Kang, Seoul (KR); Young-Hwan Jung, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 917 days.

(21) Appl. No.: 12/199,192

(22) Filed: Aug. 27, 2008

(65) Prior Publication Data

US 2009/0061319 A1 Mar. 5, 2009

(30) Foreign Application Priority Data

Aug. 28, 2007 (KR) .................. 10-2007-0086699

(51) Int. Cl.
*H01M 4/58* (2010.01)
(52) U.S. Cl. ............... 429/218.1; 429/220; 429/221; 429/224; 429/229; 429/231.5; 429/231.8
(58) Field of Classification Search .............. 429/220, 429/218.1, 231.5, 221, 224, 229, 231.8
See application file for complete search history.

(56) References Cited

U.S. PATENT DOCUMENTS

| | | | | |
|---|---|---|---|---|
| 6,764,791 | B2* | 7/2004 | Tamura et al. | 429/231.8 |
| 2002/0086211 | A1* | 7/2002 | Umeno et al. | 429/231.4 |
| 2003/0129497 | A1* | 7/2003 | Yamamoto et al. | 429/218.1 |
| 2006/0134516 | A1* | 6/2006 | Im et al. | 429/218.1 |
| 2007/0077490 | A1* | 4/2007 | Kim et al. | 429/218.1 |
| 2007/0190416 | A1* | 8/2007 | Yamada et al. | 429/218.1 |
| 2008/0118844 | A1* | 5/2008 | Miyamoto et al. | 429/231.5 |
| 2008/0166634 | A1* | 7/2008 | Kim et al. | 429/218.1 |
| 2008/0193831 | A1* | 8/2008 | Mah et al. | 429/122 |

FOREIGN PATENT DOCUMENTS

| | | |
|---|---|---|
| KR | 1020020094530 | 12/2002 |
| KR | 1020040095848 | 11/2004 |

OTHER PUBLICATIONS

English translation of Abstract of KR 1020020094530, Dec. 2002.
English translation of Abstract of KR 1020040095848, Nov. 2004.

* cited by examiner

*Primary Examiner* — Helene Klemanski
(74) *Attorney, Agent, or Firm* — Vierra Magen Marcus & DeNiro LLP

(57) ABSTRACT

Disclosed are a silicon thin film anode for a lithium secondary battery having enhanced cycle characteristics and capacity and a preparation method thereof. A preparation method for a silicon thin film anode for a lithium secondary battery, comprises: preparing a collector including a metal; forming an anode active material layer including a silicon on the collector; forming one or more interface stabilizing layer, by annealing the collector and the anode active material layer under one of an inert atmosphere, a reduced atmosphere, and a vacuum atmosphere to react a metallic component of at least one of the collector and the anode active material layer with a silicon component of the anode active material layer at an interface therebetween; and forming a carbon coating layer on the anode active material layer by performing an annealing process in a hydrocarbon atmosphere.

21 Claims, 12 Drawing Sheets

SILICON THIN FILM ANODE FOR LITHIUM SECONDARY BATTERY AND PREPARATION METHOD THEREOF

RELATED APPLICATION

The present invention claims priority from Korean Application No. 10-2007-0086699, filed on Aug. 28, 2007, which is herein expressly incorporated by reference in its entirety.

BACKGROUND OF THE INVENTION

1. Field of the Invention

The present invention relates to a silicon thin film anode for a lithium secondary battery and a preparation method thereof, and more particularly, to a silicon thin film anode for a lithium secondary battery having enhanced cycle characteristics and capacity and a preparation method thereof.

2. Description of the Background Art

Among secondary batteries, a lithium battery is being most spotlighted due to its high energy density and light weight. Especially, a lithium secondary battery is being mainly used in portable electronic appliances such as a mobile phone and a notebook. As IT technologies are continuously developed domestically or in foreign countries, demands for the lithium secondary battery in the future are expected to drastically increase. Under this situation, domestic electronic companies are researching to increase productivity for the lithium secondary battery every year.

The lithium secondary battery includes a silicon thin film anode. In order to enhance cycle characteristics and capacity, the conventional silicon thin film anode was prepared by a structure of an Si—Ag multi-layer that a silicon (Si) layer and a silver (Ag) layer are repeatedly laminated, disclosed in Korean Patent Application No. 10-2001-0052112, a structure that a silicon-metal (Si-M) layer and a silver (Ag) layer are repeatedly laminated, disclosed in Korean patent Application No. 10-2001-0051588, and a structure that a silicon (Si) layer and a molybdenum (Mb) layer are alternately laminated, disclosed in Korean Patent Application No. 10-2006-0067459.

However, the conventional structures and preparation methods are complicated. Furthermore, when a lithium secondary battery is continuously charged and discharged, a structure variation easily occurs due to a volume change of a silicon layer. The structure variation causes a silicon layer to be separated from a collector, thereby gradually decreasing a capacity and a cycle performance of the lithium secondary battery.

SUMMARY OF THE INVENTION

Therefore, it is one object of the present invention to provide a silicon thin film anode for a lithium secondary battery capable of enhancing a capacity and cycle characteristics thereof.

It is another object of the present invention to provide a preparation method for a silicon thin film anode for a lithium secondary battery capable of enhancing a capacity and cycle characteristics of a silicon thin film anode.

It is still another object of the present invention to provide a lithium secondary battery having a silicon thin film anode capable of enhancing a capacity and cycle characteristics of a silicon thin film anode.

To achieve these and other advantages and in accordance with the purpose of the present invention, as embodied and broadly described herein, there is provided a silicon thin film anode for a lithium secondary battery, comprising: a collector including a metal; an anode active material layer formed on the collector, and including a silicon; and a carbon coating layer covering the anode active material layer.

Here, the anode active material layer may be one of a silicon thin film, a silicon-metal multi-layer that a silicon thin film and a metallic thin film are sequentially laminated, a silicon-metal single layer that a silicon and a metal are simultaneously formed in one layer, and a composite layer that at least one of them is repeatedly laminated.

The silicon thin film anode for a lithium secondary battery may further comprise a metallic buffer layer interposed between the collector and the anode active material layer, and including a metal.

The silicon thin film anode for a lithium secondary battery may further comprise one or more interface stabilizing layer formed at an interface between a metallic component of at least one of the collector, the metallic buffer layer and the anode active material layer, and a silicon component of the anode active material layer, by reacting the metallic component with the silicon component in an annealing manner. Here, the interface stabilizing layer may comprise a silicide compound.

One of the metal and the metallic thin film may be at least one selected from a group composed of titanium, nickel, copper, iron, chrome, manganese, cobalt, vanadium, tin, indium, zinc, gallium, germanium, zirconium, molybdenum, and antimony.

The anode active material layer may be formed to have a thickness of 10 nm~10 µm, the metallic buffer layer may be formed to have a thickness of 5 nm~200 nm, and the carbon coating layer may be formed to have a thickness of 5 nm~200 nm.

To achieve these and other advantages and in accordance with the purpose of the present invention, as embodied and broadly described herein, there is also provided a preparation method for a silicon thin film anode for a lithium secondary battery, comprising: preparing a collector including a metal; forming an anode active material layer including a silicon on the collector; forming one or more interface stabilizing layer, by annealing the collector and the anode active material layer under one of an inert atmosphere, a reduced atmosphere, and a vacuum atmosphere to react a metallic component of at least one of the collector and the anode active material layer with a silicon component of the anode active material layer at an interface therebetween; and forming a carbon coating layer on the anode active material layer by performing an annealing process under a hydrocarbon atmosphere.

According to another aspect of the present invention, there is provided a preparation method for a silicon thin film anode for a lithium secondary battery, comprising: preparing a collector including a metal; forming an anode active material layer including a silicon on the collector; and simultaneously forming one or more interface stabilizing layer, and a carbon coating layer on the anode active material, by annealing the collector and the anode active material layer under a hydrocarbon atmosphere to react a metallic component of at least one of the collector and the anode active material layer with a silicon component of the anode active material layer at an interface therebetween.

Before forming the anode active material layer, the method may further comprise forming a metallic buffer layer including a metal between the collector and the anode active material layer. The interface stabilizing layer may be further formed between the metallic buffer layer and the anode active material layer.

The metallic buffer layer may be formed by an RF magnetron sputtering process using a metallic target. Here, the metallic target may include at least one selected from a group composed of titanium, nickel, copper, iron, chrome, manganese, cobalt, vanadium, tin, indium, zinc, gallium, germanium, zirconium, molybdenum, and antimony.

The step of forming the anode active material layer may be performed by at least one of: a method for forming a silicon thin film by an RF magnetron sputtering process using a silicon target, a method for forming a silicon-metal multi-layer by forming a silicon thin film by an RF magnetron sputtering process using a silicon target, and then by forming a metallic thin film by an RF magnetron sputtering process using a metallic target, and a method for forming a silicon-metal single layer by an RF magnetron sputtering process simultaneously using a silicon target and a metallic target. Here, the metallic target may include at least one selected from a group composed of titanium, nickel, copper, iron, chrome, manganese, cobalt, vanadium, tin, indium, zinc, gallium, germanium, zirconium, molybdenum, and antimony.

Here, the hydrocarbon may be one of ethylene, propylene, butylene, methane, ethane, propane, butane, gas composed of two or more of them, and mixed gas obtained by mixing inert gas to them.

The annealing process may be performed for 1 minute~24 hours at a temperature of 200° C.~900° C.

The anode active material layer may be formed to have a thickness of 10 nm~10 μm, the carbon coating layer may be formed to have a thickness of 5 nm~200 nm, and the metallic buffer layer may be formed to have a thickness of 5 nm~200 nm.

To achieve these and other advantages and in accordance with the purpose of the present invention, as embodied and broadly described herein, there is still also provided a lithium secondary battery having a silicon thin film anode, wherein the silicon thin film comprises: a collector including a metal; an anode active material layer formed on the collector, and including a silicon; and a carbon coating layer covering the anode active material layer.

Here, the anode active material layer may be one of a silicon thin film, a silicon-metal multi-layer that a silicon thin film and a metallic thin film are sequentially laminated, a silicon-metal single layer that a silicon and a metal are simultaneously formed in one layer, and a composite layer that at least one of them is repeatedly laminated.

The lithium secondary battery may further comprise a metallic buffer layer interposed between the collector and the anode active material layer, and including a metal.

The lithium secondary battery may further comprise one or more interface stabilizing layer formed at an interface between a metallic component of at least one of the collector, the metallic buffer layer and the anode active material layer, and a silicon component of the anode active material layer, by reacting the metallic component with the silicon component in an annealing manner. Here, the interface stabilizing layer may comprise a silicide compound.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the preferred embodiments of the present invention, examples of which are illustrated in the accompanying drawings.

Hereinafter, a structure of a silicon thin film anode, a preparation method thereof, and a lithium secondary battery therewith according to the present invention will be explained in more detail with reference to the attached drawings.

Figure 1:
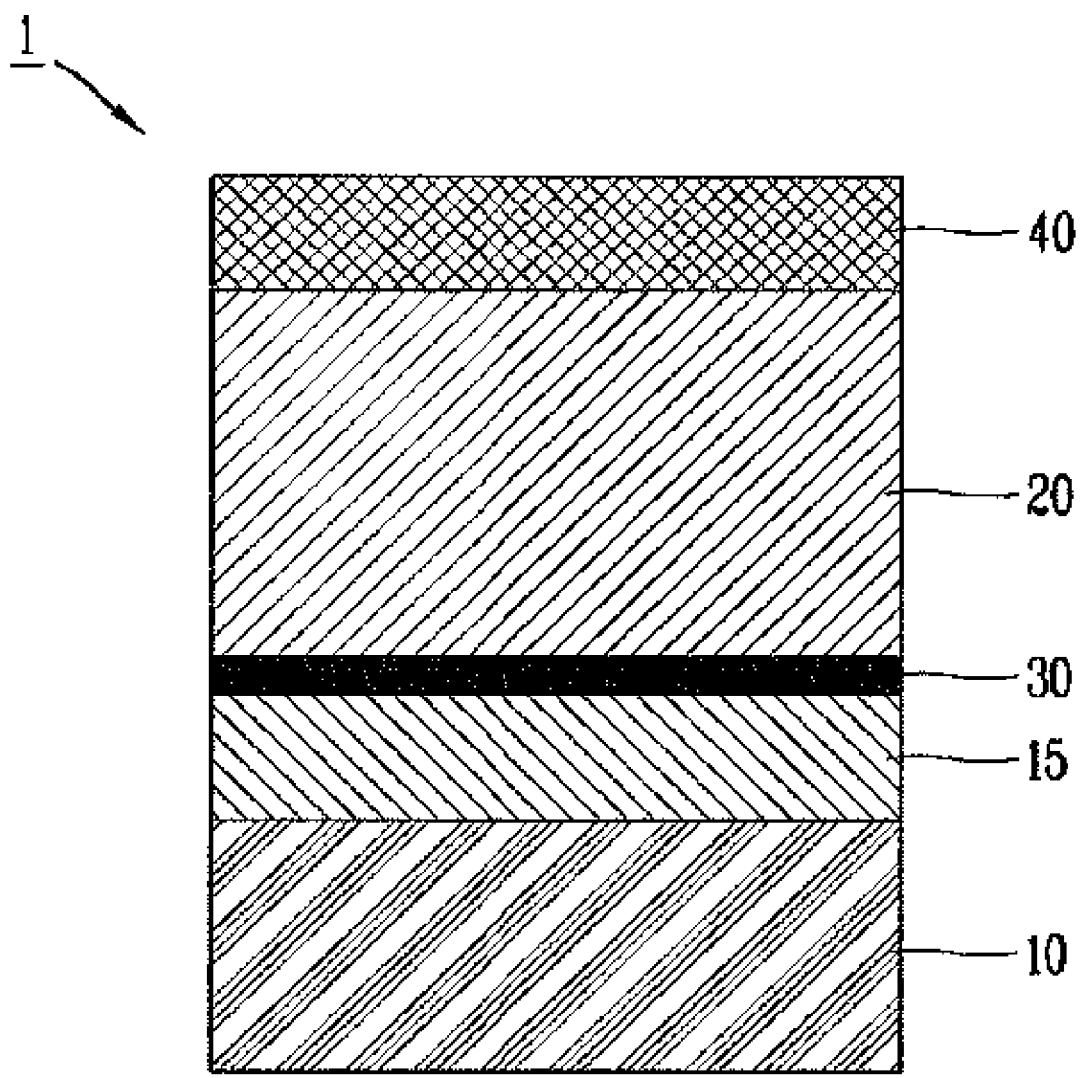
FIG. 1 is a schematic view showing one structure of a silicon thin film anode according to the present invention.
Figure 2:
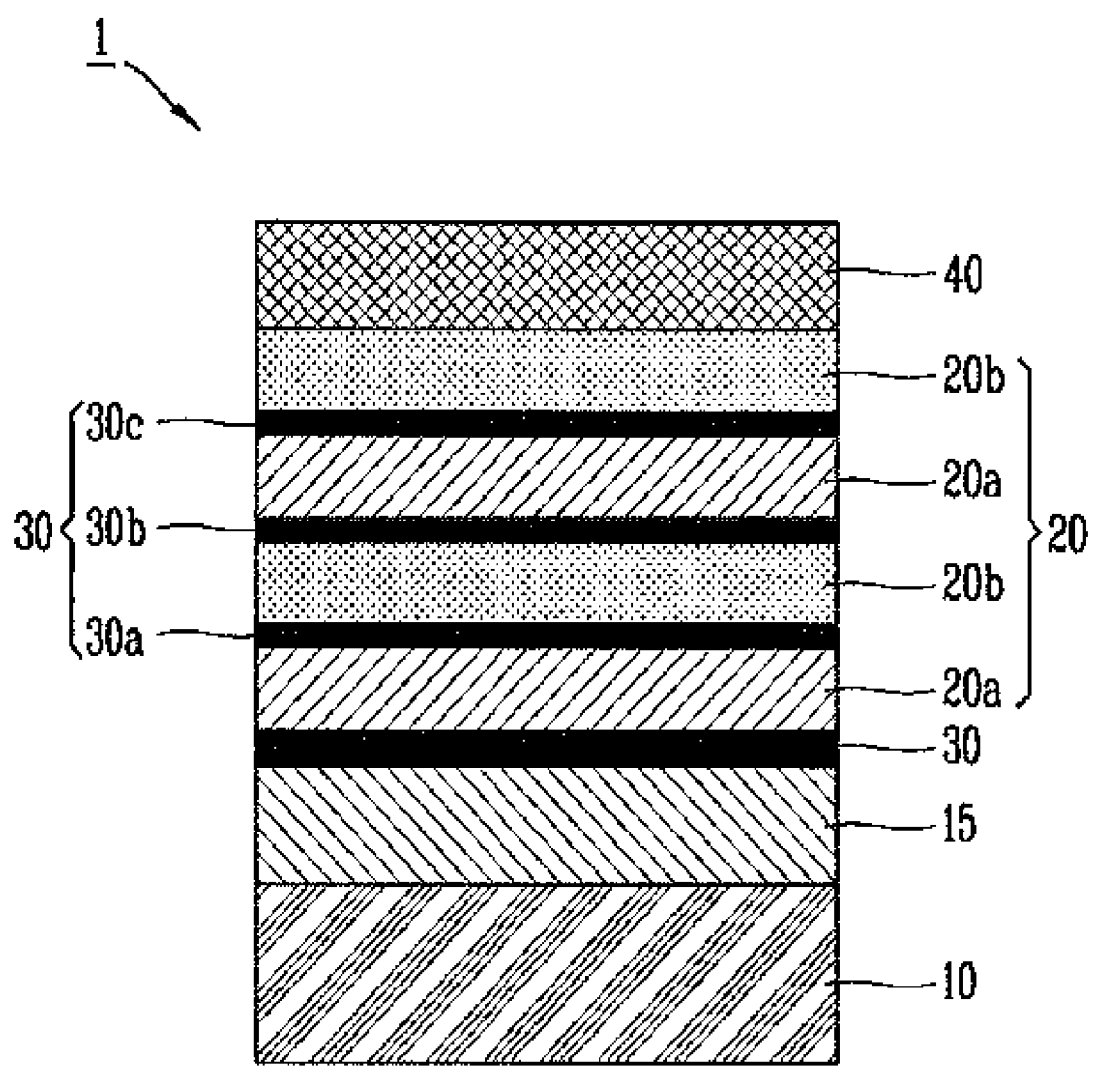
FIG. 2 is a schematic view showing another structure of the silicon thin film anode according to the present invention.

With reference to FIGS. 1 and 2, will be explained a schematic structure of a silicon thin film anode 1 having carbon coated thereon according to the present invention.

As shown in FIG. 1, a silicon thin film anode 1 comprises a collector 10, an anode active material layer 20 formed on the collector 10, a carbon coating layer 40 formed on the anode active material layer 20, and one or more interface stabilizing layers 30 formed between a metallic component layer (a metallic thin film inside the collector, a metallic buffer layer, or the anode active material layer) and a silicon component layer (a silicon thin film inside the anode active material layer). The silicon thin film anode 1 may further comprise a metallic buffer layer 15 interposed between the collector 10 and the anode active material layer 20. Here, the metallic buffer layer 15 may be formed, or may not be formed. In the present invention, it is assumed that the metallic buffer layer 15 is formed.

The collector 10 is composed of one of copper, nickel, titanium, aluminum, silicon, and silicon alloy, or alloy of them. As the collector 10, a copper foil is mainly used.

The metallic buffer layer 15 is formed on the collector 10. The metallic buffer layer 15 serves to attenuate a stress between the collector 10 and the anode active material layer 20, and to obtain a stability at an interface therebetween. The metallic buffer layer 15 of the present invention may include at least one of titanium, nickel, copper, iron, chrome, manganese, cobalt, vanadium, tin, indium, zinc, gallium, germanium, zirconium, molybdenum, antimony, and alloy of them.

Preferably, the metallic buffer layer 15 of the present invention has a thickness of 5 nm~200 nm. If the metallic buffer layer 15 is too thin, a stress attenuating function and an interface stabilizing function are inferior. On the contrary, if the metallic buffer layer 15 is too thick, a volume of the silicon thin film anode 1 is increased. A metallic component of the metallic buffer layer 15 may react with a silicon component of the anode active material layer 20 on the metallic buffer layer 15 by an annealing process, thereby forming an interface stabilizing layer 30. As aforementioned, whether to form the metallic buffer layer 15 is selective. However, it is preferable to form the metallic buffer layer 15 so as to enhance a capacity and a cycle performance of the silicon thin film anode 1.

The anode active material layer 20 is formed on the metallic buffer layer 15. The anode active material layer 20 may be one of a silicon thin film, a silicon-metal multi-layer that a silicon thin film and a metallic thin film are sequentially laminated, a silicon-metal single layer that a silicon and a metal are simultaneously formed in one layer, and a composite layer that at least one of them is repeatedly laminated. Here, the metallic thin film or the metal may be at least one of titanium, nickel, copper, iron, chrome, manganese, cobalt, vanadium, tin, indium, zinc, gallium, germanium, zirconium, molybdenum, antimony, and alloy of them. A thickness of a silicon thin film of the anode active material layer 20 is a factor to determine a substantial discharge capacity of the silicon thin film anode 1. If the silicon thin film is thick, a cycle performance of the silicon thin film anode may be lowered even if a discharge capacity thereof is increased. In order to obtain a high discharge capacity and an excellent cycle performance of the anode active material layer 20, a silicon thin film and a metallic thin film are repeatedly laminated, or a metallic component is included in a silicon thin film. In the present invention, the anode active material layer 20 is deposited on the metallic buffer layer 15 with a thickness of 10 nm~10 μm. When the anode active material layer 20 is too thick, the silicon thin film anode 1 has an increased volume, which is not preferable. On the contrary, when the anode active material layer 20 is too thin, a desired capacity can not be obtained.

If the anode active material layer 20 is thickly formed of only a silicon thin film, it is difficult to effectively control a volume increase of the silicon thin film. Accordingly, as shown in FIG. 2, it is preferable to sequentially laminate a silicon thin film 20a and a metallic thin film 20b. The anode active material layer 20 may be formed by repeatedly laminating the silicon thin film 20a and the metallic thin film 20b. The anode active material layer 20 may be also formed by including a metallic component to the silicon thin film (silicon-metal single layer). Here, the metallic component and the metallic thin film 20b serve to prevent or attenuate a volume increase of the silicon thin film 20a. When the anode active material layer 20 is formed of a silicon-metal single layer, it is preferable to uniformly distribute a metallic component into a silicon thin film. If the metallic component is distributed into the silicon thin film uniformly enough to approximately correspond to an alloy, conductivity lowering due to volume change of the silicon thin film is minimized. That is, even if the silicon thin film is broken, a conductivity of the silicon thin film anode 1 is maintained as a level more than a predetermined level. As shown in FIG. 2, a first interface stabilizing layer 30a, a second interface stabilizing layer 30b, and a third interface stabilizing layer 30c are formed between the metallic thin film 20b and the silicon thin film 20a by an annealing process.

As shown in FIG. 1, the interface stabilizing layer 30 is formed between the metallic buffer layer 15 and the anode active material layer 20. As shown in FIG. 2, when the anode active material layer 20 is formed of a silicon-metal multi-layer that the silicon thin film 20a and the metallic thin film 20b are repeatedly laminated, the interface stabilizing layers 30a and 30b are also formed between the silicon thin film 20a and the metallic thin film 20b. Although not shown, when the metallic buffer layer 15 is not formed, that is, when the anode active material layer 20 including a silicon is directly formed on the collector 10, the interface stabilizing layer 30 is formed between the collector 10 and the anode active material layer 20. Here, the interface stabilizing layer 30 is one or more layers formed by reacting a metallic component and a silicon component with each other at an interface therebetween in an annealing manner. The interface stabilizing layer 30 includes a silicide compound. The interface stabilizing layer 30 formed by reacting a silicon component and a metallic component with each other serves to attenuate volume increase of a silicon, and to stabilize an interface. Also, the interface stabilizing layer enhances an adhesive property of a silicon thin film.

A carbon coating layer 40 is formed on the anode active material layer 20 by annealing the collector 10, the metallic buffer layer 15, the anode active material layer 20, etc. in a hydrocarbon atmosphere for 1 minute~24 hours at a temperature of 200° C.~900° C. A thickness (d3) of the carbon coating layer 40 is in a range of 5 nm~200 nm. If the carbon coating layer 40 is too thin, the following functions deteriorate. On the contrary, if the carbon coating layer 40 is too thick, a volume of the silicon thin film anode 1 is increased.

The carbon coating layer 40 of the present invention serves to prevent or attenuate volume change of the silicon thin film during charging and discharging, and to minimize separation of the silicon thin film due to volume change of the silicon thin film. That is, the carbon coating layer 40 enhances an adhesive property of the silicon thin film. Furthermore, when the silicon thin film anode 1 having the carbon coating layer 40 is prepared for a lithium secondary battery, the carbon coating layer 40 does not react with an electrolyte solution inside the lithium secondary battery due to its amorphous structure, thereby maintaining a stable state and a conductivity. If the carbon coating layer 40 does not exist, the anode active material layer 20 reacts with an electrolyte solution on the surface thereof during a first cycle charging, thereby forming a solid electrolyte interface (SEI) film. The SEI film increases resistance due to its low conductivity, thereby lowering a battery performance (cycle characteristics, life-span, charging/discharging efficiency, high rate performance). Accordingly, it is preferable to form the carbon coating layer 40 having conductivity but not reacting with an electrolyte on the anode active material layer 20. This prevents occurrence of an SEI film during the initial charging, thereby stably and continuously maintaining conductivity. Furthermore, if a layer contacting an electrolyte reacts with the electrolyte, the electrolyte is decomposed to occur gas. This may cause accidents such as an electrolyte leakage as a pressure is filled in a lithium secondary battery. However, once the carbon coating layer 40 is formed, these problems are minimized since the carbon coating layer 40 does not react with an electrolyte.

The silicon thin film anode 1 includes the carbon coating layer 40 and the interface stabilizing layer 30, thereby minimizing volume change of a silicon component during charging and discharging, stabilizing an interface between each layer, and enhancing adherence and conductivity. Furthermore, the silicon thin film anode 1 increases an entire capacity by continuously maintaining its capacity while cycles are repeated. Accordingly, a silicon thin film anode having carbon coated thereon for a lithium secondary battery is prepared.

Hereinafter, a preparation method for a silicon thin film anode according to the present invention will be explained in more detail.

Firstly, a preparation method for a silicon thin film anode having a structure shown in FIGS. 1 and 2 will be explained. The silicon thin film anode 1 having a structure shown in FIGS. 1 and 2 may be prepared by two different methods.

According to a first method, an interface stabilizing layer 30 and a carbon coating layer 40 are respectively formed by different annealing processes. According to a second method, the interface stabilizing layer 30 and the carbon coating layer 40 are simultaneously formed by the same annealing process.

Firstly, the first preparation method for a silicon thin film anode having a structure shown in FIGS. 1 and 2 will be explained. Then, the second preparation method will be explained.

Firstly, a collector 10 is prepared. The collector 10 may be prepared on a substrate in the form of a metallic foil by a sputtering process using a metallic target. The metallic target may be one of copper, nickel, titanium, aluminum, silicon, and silicon alloy, or alloy of them. As the metallic target, a copper foil is mainly used.

Then, a metallic buffer layer 15 is formed on the collector 10. The metallic buffer layer 15 may be formed by an RF magnetron sputtering process using a metallic target. The metallic target may be one of titanium, nickel, copper, iron, chrome, manganese, cobalt, vanadium, tin, indium, zinc, gallium, germanium, zirconium, molybdenum, antimony, and alloy of them. Preferably, the metallic buffer layer 15 is deposited with a thickness of 5 nm~200 nm. If the metallic buffer layer 15 is too thin, a stress attenuating function and an interface stabilizing function are inferior. On the contrary, if the metallic buffer layer 15 is too thick, a volume of the silicon thin film anode 1 is increased. The metallic buffer layer 15 serves to attenuate a stress between the collector 10 and the anode active material layer 20, and to obtain stability at an interface therebetween.

Then, the anode active material layer 20 is formed on the metallic buffer layer 15. The anode active material layer 20 may have various structures. More concretely, the anode active material layer 20 may be one of a silicon thin film, a silicon-metal multi-layer that a silicon thin film and a metallic thin film are sequentially laminated, a silicon-metal single layer that a silicon and a metal are simultaneously formed in one layer, and a composite layer that at least one of them is repeatedly laminated. When the anode active material layer 20 is to be implemented as a silicon thin film, a silicon thin film may be formed on the metallic buffer layer 15 by an RF magnetron sputtering process using a silicon target. As shown in FIG. 2, when the anode active material layer 20 is to be implemented as a silicon-metal multi-layer, a silicon thin film is formed by an RF magnetron sputtering process using a silicon target, and then a metallic thin film is formed by an RF magnetron sputtering process using a metallic target. When the anode active material layer 20 is to be implemented as a silicon-metal single layer, a silicon-metal single layer may be formed by an RF magnetron sputtering process simultaneously using a silicon target and a metallic target. When the anode active material layer 20 is to be implemented as a composite layer, the above processes may be combined to each other. When the anode active material layer 20 is formed of a silicon-metal single layer, it is preferable to uniformly distribute a metallic component into a silicon thin film. If the metallic component is distributed into the silicon thin film uniformly enough to approximately correspond to an alloy, conductivity lowering due to volume change of the silicon thin film is minimized. That is, even if the silicon thin film is broken, a conductivity of the silicon thin film anode 1 is maintained as a level more than a predetermined level.

The metallic target may be one of titanium, nickel, copper, iron, chrome, manganese, cobalt, vanadium, tin, indium, zinc, gallium, germanium, zirconium, molybdenum, antimony, and alloy of them. Here, it is preferable to deposit the silicon thin film with a thickness of 10 nm~10 μm by controlling sputtering conditions (time, etc.). A thickness of the silicon thin film of the anode active material layer 20 is a factor to determine a substantial discharge capacity of the silicon thin film anode 1. If the silicon thin film is thick, a cycle performance of the silicon thin film anode 1 may be lowered even if a discharge capacity thereof is increased. When the silicon thin film is too thick, the silicon thin film anode 1 has an increased volume, which is not preferable. On the contrary, when the silicon thin film is too thin, a desired capacity can not be obtained. As shown in FIG. 2, a metallic thin film 20b inserted between the silicon thin films 20a serves to prevent or attenuate volume increase of the silicon thin films 20a.

Then, the collector 10, the metallic buffer layer 15, and the anode active material layer 20 are annealed in one circumstance of an inactive atmosphere, a deoxidation atmosphere, and a vacuum atmosphere, thereby forming one or more interface stabilizing layer. The annealing process is performed for 1 minute~24 hours at a temperature of 200° C.~900° C. The inactive atmosphere is an atmosphere of argon and nitrogen, and the deoxidation atmosphere is an atmosphere of mixed gas between argon and hydrogen, and mixed gas between nitrogen and hydrogen. Here, the interface stabilizing layer 30 is one or more layers formed by reacting a metallic component and a silicon component with each other at an interface therebetween in an annealing manner. The interface stabilizing layer 30 is formed between the metallic buffer layer 15 and the anode active material layer 20. As shown in FIG. 2, when the anode active material layer 20 is formed of a silicon-metal multi-layer that the silicon thin film 20a and the metallic thin film 20b are repeatedly laminated, the interface stabilizing layers 30a and 30b are also formed between the silicon thin film 20a and the metallic thin film 20b. Although not shown, when the metallic buffer layer 15 is not formed, that is, when the anode active material layer 20 including a silicon is directly formed on the collector 10, the interface stabilizing layer 30 is formed between the collector 10 and the anode active material layer 20.

A carbon coating layer 40 is formed on the anode active material layer 20 by performing an annealing process in a hydrocarbon atmosphere for 1 minute~24 hours at a temperature of 200° C.~900° C. The carbon coating layer 40 is formed to have a thickness of 5 nm~200 nm by controlling conditions for annealing (time, temperature, etc.). Here, the hydrocarbon atmosphere indicates an atmosphere of ethylene, propylene, butylene, methane, ethane, propane, butane, gas composed of two or more of them, and mixed gas obtained by mixing inactive gas to them. The carbon coating layer 40 is formed due to the following reasons. If the carbon coating layer 40 does not exist, the anode active material layer 20 reacts with an electrolyte solution on the surface thereof during a first cycle charging, thereby forming a solid electrolyte interface (SEI) film. The SEI film increases resistance due to its low conductivity, thereby lowering a battery performance (cycle characteristics, life-span, charging/discharging efficiency, high-rate performance). Accordingly, it is preferable to form the carbon coating layer 40 having conductivity but not reacting with an electrolyte on the anode active material layer 20. This prevents occurrence of an SEI film during the initial charging, thereby stably and continuously maintaining conductivity. Furthermore, if a layer contacting an electrolyte reacts with the electrolyte, the electrolyte is decomposed to occur gas. This may cause accidents such as an electrolyte leakage as a pressure is filled in a lithium secondary battery. However, once the carbon coating layer 40 is formed, these problems are minimized since the carbon coating layer 40 does not react with an electrolyte.

The step of forming the metallic buffer layer 15 is selective, i.e., the metallic buffer layer 15 may be formed or not. If the metallic buffer layer 15 is not formed, the interface stabilizing layer 30 is not formed, either.

As a result, the silicon thin film anode 1 having carbon coated thereon is completed.

Next, a second preparation method for a silicon thin film anode will be explained. Only differences from the first preparation method will be explained, and summarized parts or omitted parts will be understood with reference to the first preparation method.

Firstly, in the same or similar manner as/to the first preparation method, a collector 10, a metallic buffer layer 15, and an anode active material layer 20 are formed.

Then, the collector 10, the metallic buffer layer 15, and the anode active material layer 20 undergo an annealing process in a hydrocarbon atmosphere, thereby simultaneously forming an interface stabilizing layer 30 and a carbon coating layer 40. Here, the annealing process is performed for 1 minute~24 hours at a temperature of 200° C.~900° C. Here, the hydrocarbon atmosphere indicates an atmosphere of ethylene, propylene, butylene, methane, ethane, propane, butane, gas composed of two or more of them, and mixed gas obtained by mixing inactive gas to them. For stability, the annealing process is preferably performed in a mixed hydrocarbon atmosphere including argon, etc., which allows the interface stabilizing layer 30 and the carbon coating layer 40 to be simultaneously formed.

As a result, the silicon thin film anode 1 having carbon coated thereon is completed.

An electrolyte is disposed between the silicon thin film anode 1 prepared by the aforementioned method, and a cathode, thereby preparing a lithium secondary battery.

The prepared silicon thin film anode for a lithium secondary battery comprises: a collector including a metal; an anode active material layer formed on the collector, and including a silicon; and a carbon coating layer covering the anode active material layer. Here, the anode active material layer may be one of a silicon thin film, a silicon-metal multi-layer that a silicon thin film and a metallic thin film are sequentially laminated, a silicon-metal single layer that a silicon and a metal are simultaneously formed in one layer, and a composite layer that at least one of them is repeatedly laminated. The silicon thin film anode for a lithium secondary battery may further comprise a metallic buffer layer interposed between the collector and the anode active material layer, and including a metal. The silicon thin film anode for a lithium secondary battery may further comprise one or more interface stabilizing layer formed at an interface between a metallic component of at least one of the collector, the metallic buffer layer and the anode active material layer, and a silicon component of the anode active material layer, by reacting the metallic component with the silicon component in an annealing manner. Here, the interface stabilizing layer may comprise a silicide compound.

The lithium secondary battery having the silicon thin film anode of an enhanced capacity and cycle characteristics has an enhanced performance.

Hereinafter, various examples and comparative examples will be explained so as to observe cycle characteristics, etc. of the silicon thin film anode 1 prepared according to the present invention.

EXAMPLE 1

In the example 1, an anode active material layer was formed of only a silicon thin film, and the metallic buffer layer of FIG. 1 was not formed.

Firstly, a collector formed of a copper foil was prepared. Then, an anode active material layer (silicon thin film) was deposited on the collector by an RF magnetron sputtering process using a silicon target having a purity of 99.9%. Here, the silicon thin film was deposited to have a thickness of 500 nm. The thickness of the silicon thin film was observed by using an atomic force microscope (AFM) or an alpha step surface profiler, etc. In order to enhance an interface characteristic between deposited layers, the deposited thin film anode underwent an annealing process in an argon atmosphere by using a rapid thermal analyzer (RTA). The annealing process was performed for 20 minutes at a temperature of 400° C. having initially raised for 5 minutes. Then, the temperature of 400° C. drastically dropped to 25° C. Next, the annealing process was performed for 6 hours at a temperature of 700° C. in a hydrocarbon atmosphere that 90% argon by weight and 10% propylene by weight were mixed, thereby coating carbon on the silicon thin film anode. Then, a porous separation film having a thickness of 20 μm and formed of polypropylene was interposed between the silicon thin film anode having carbon coated thereon serving as one electrode, and a lithium foil serving as counter electrode. Then, to the electrodes and the porous separation film, injected was an electrolyte solution that 1M of lithium salt ($LiPF_6$) was dissolved in an organic solvent (EC/EMC/DMC mixed solution) that ethyl carbonate/ethyl methyl carbonate/dimethyl carbonate were mixed to each other, thereby performing a half cell assembly. This assembly process was performed in a dry room having a dew-point temperature of −50° C.

COMPARATIVE EXAMPLE 1

In the comparative example 1, a silicon thin film anode was prepared by omitting only the annealing process performed in the example 1. That is, a silicon thin film anode having no carbon coated thereon, and having no interface stabilizing layer was formed. A porous separation film having a thickness of 20 μm and formed of polypropylene was interposed between the silicon thin film anode serving as one electrode, and a lithium foil serving as counter electrode. Then, to the electrodes and the porous separation film, injected was an electrolyte solution that 1M of lithium salt (LiPF6) was dissolved in an organic solvent (EC/EMC/DMC mixed solution) that ethyl carbonate/ethyl methyl carbonate/dimethyl carbonate were mixed to each other, thereby performing a half cell assembly. This assembly process was performed in a dry room having a dew-point temperature of −50° C.

Figure 3A:
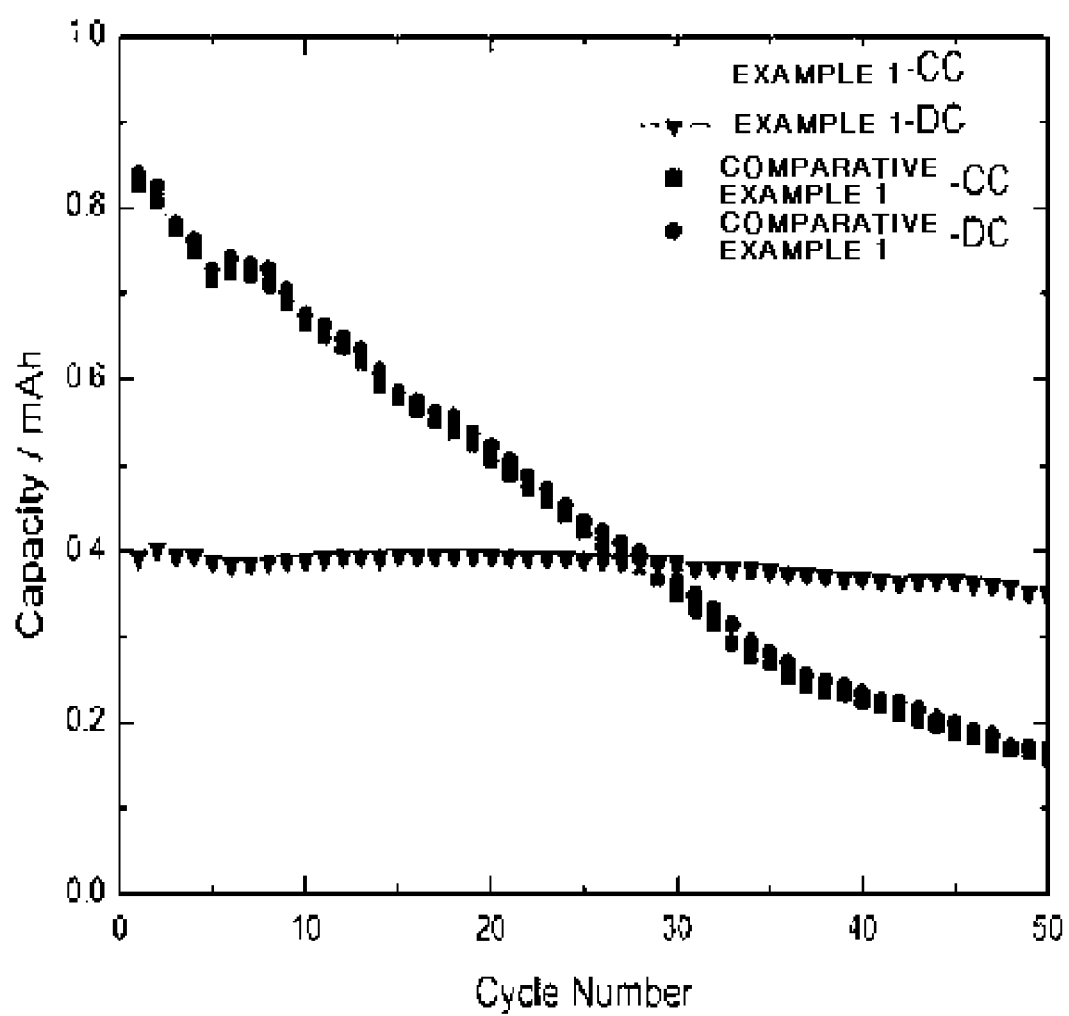
FIGS. 3A and 3B are graphs comparing cycle characteristics and efficiency of a silicon thin film anode prepared according to an example 1 to those of a silicon thin film anode prepared according to a comparative example 1.
Figure 3B:
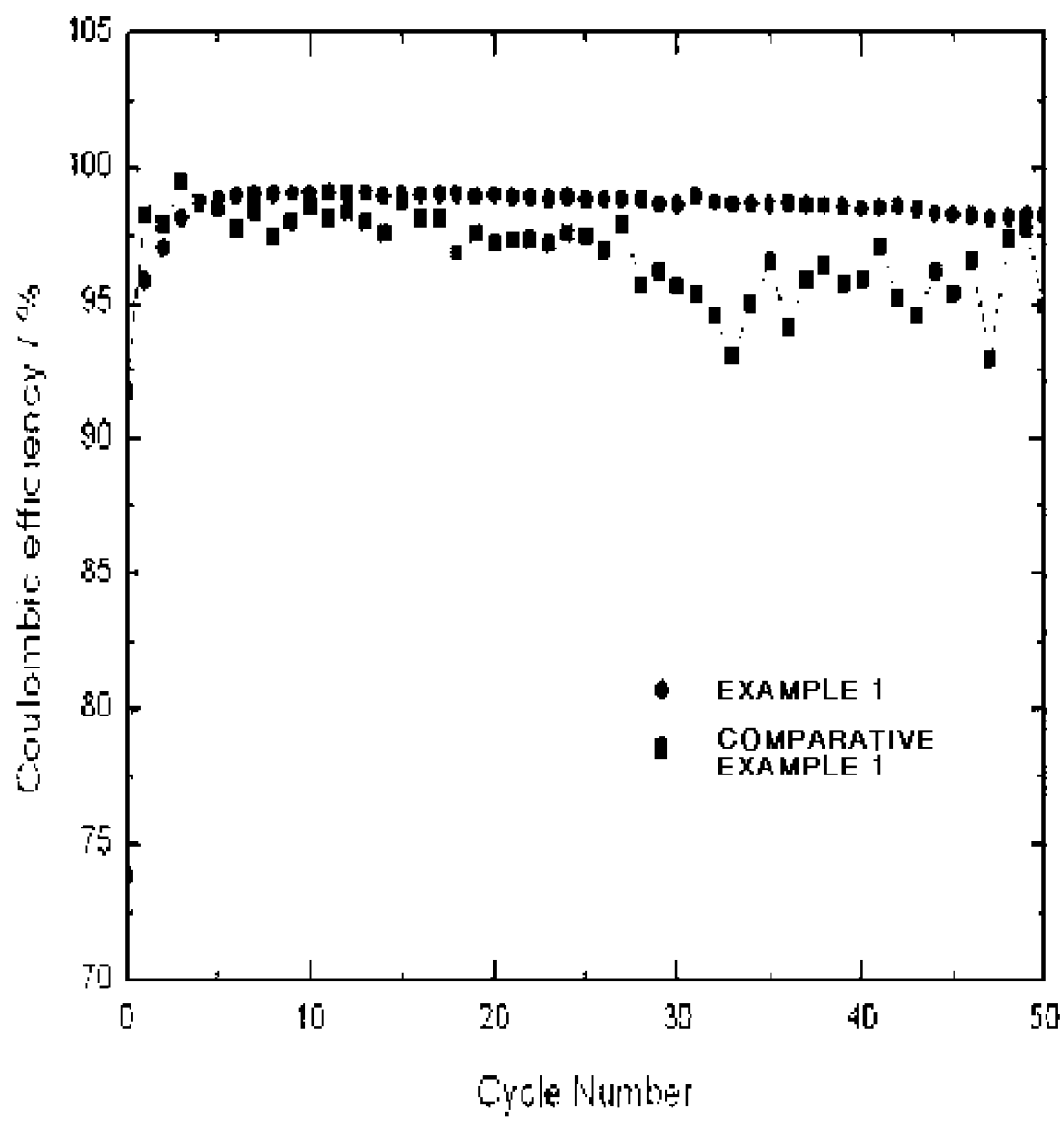

In order to compare the example 1 with the comparative example 1 in the aspects of a performance and cycle characteristics, charging and discharging experiments were performed. The charging and discharging experiments were performed in a constant-current manner at a potential of 0.02~1.2V with a current density of 2.33 mg/cm² in contrast to a weight of a deposited amorphous silicon thin film anode to that of the assembled half cell. As a result, as shown in FIG. 3A, the silicon thin film anode (example 1) having carbon coated thereon showed an initial discharge capacity of 0.40 mAh, which was smaller than that of the silicon thin film anode having no carbon coated thereon (comparative example 1). However, the silicon thin film anode (example 1) showed an excellent cycle performance not causing a capacity decrease while cycles are repeated up to 50 times, and also showed an excellent cycle efficiency close to 100% as shown in FIG. 3B.

The silicon thin film anode having no carbon coated thereon showed an initial discharge capacity of 0.82 mAh corresponding to a theoretical capacity. However, the initial discharge capacity drastically decreased as cycles are repeated. Furthermore, the silicon thin film anode having no carbon coated thereon showed an unstable cycle efficiency, while it initially showed a cycle efficiency close to 100%.

That is, in the example 1, the silicon thin film anode having carbon coated thereon continuously maintained its capacity while cycles were repeated, thereby having an increased entire capacity. It is judged that the effect resulted from that the silicon thin film anode could effectively control its volume change during charging and discharging owing to the interface stabilizing layer (silicide compound) and the conductive carbon coating layer between the silicon thin film and the collector.

EXAMPLE 2

In the example 2, a metallic buffer layer was formed, and an anode active material layer was formed of only a silicon thin film.

Firstly, a metallic buffer layer (titanium thin film layer) having a thickness of 50 nm was deposited on a collector by an RF magnetron sputtering process using a titanium target having a purity of 99.9%. Then, an anode active material layer (silicon thin film) was deposited with a thickness of 500 nm on the metallic buffer layer. The deposited silicon thin film anode underwent an annealing process and a carbon coating process in the same manner as the example 1. Then, in order to observe a performance and cycle characteristics of the prepared silicon thin film anode, a half cell assembly is performed in the same manner as the example 1.

COMPARATIVE EXAMPLE 2

In the comparative example 2, a silicon thin film anode was prepared by omitting only the annealing process performed in the example 2. That is, a silicon thin film anode having no carbon coated thereon, and having no interface stabilizing layer was formed. Then, a half cell assembly is performed in the same manner as the comparative example 1.

In order to compare the example 2 with the comparative example 2 in the aspects of a performance and cycle characteristics, charging and discharging experiments were performed.

Figure 4A:
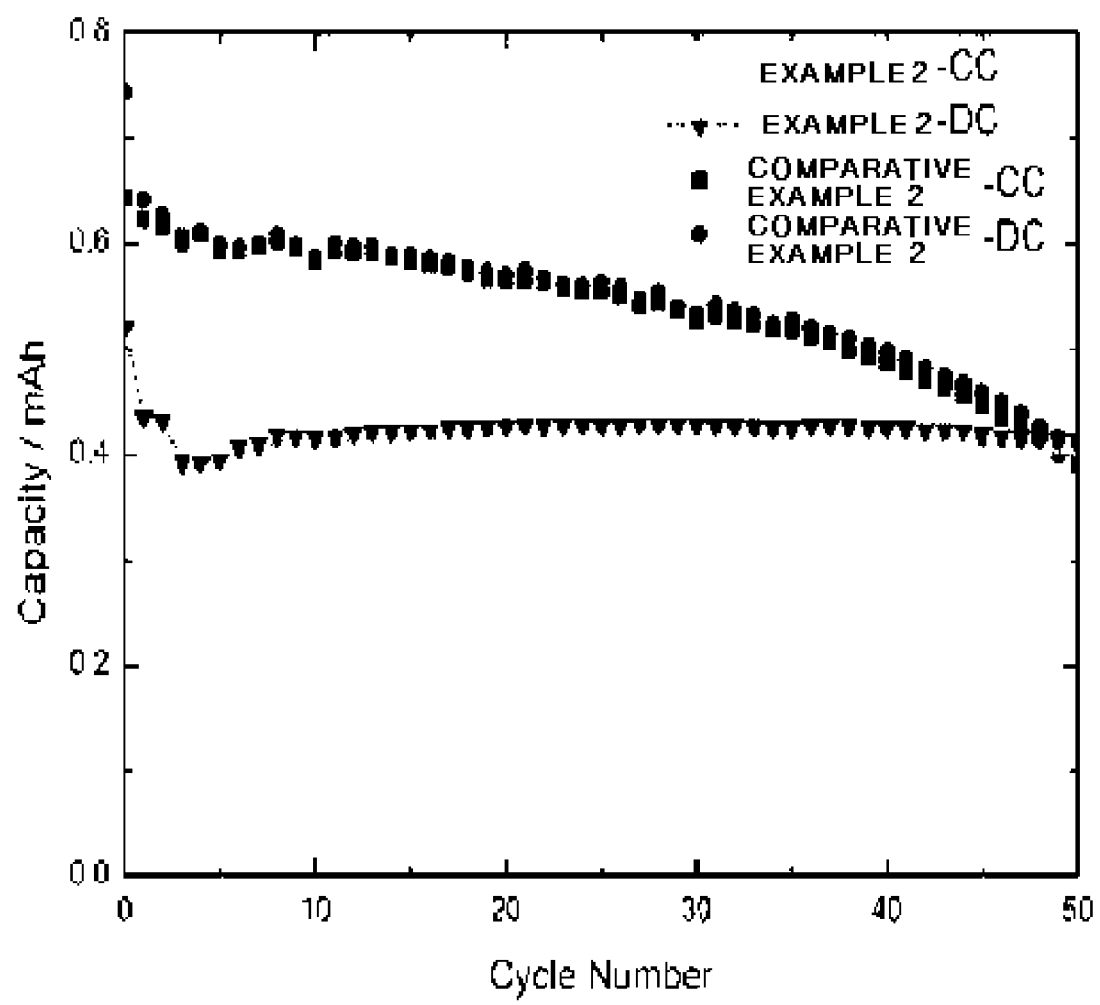
FIGS. 4A and 4B are graphs comparing cycle characteristics and efficiency of a silicon thin film anode prepared according to an example 2 to those of a silicon thin film anode prepared according to a comparative example 2.
Figure 4B:
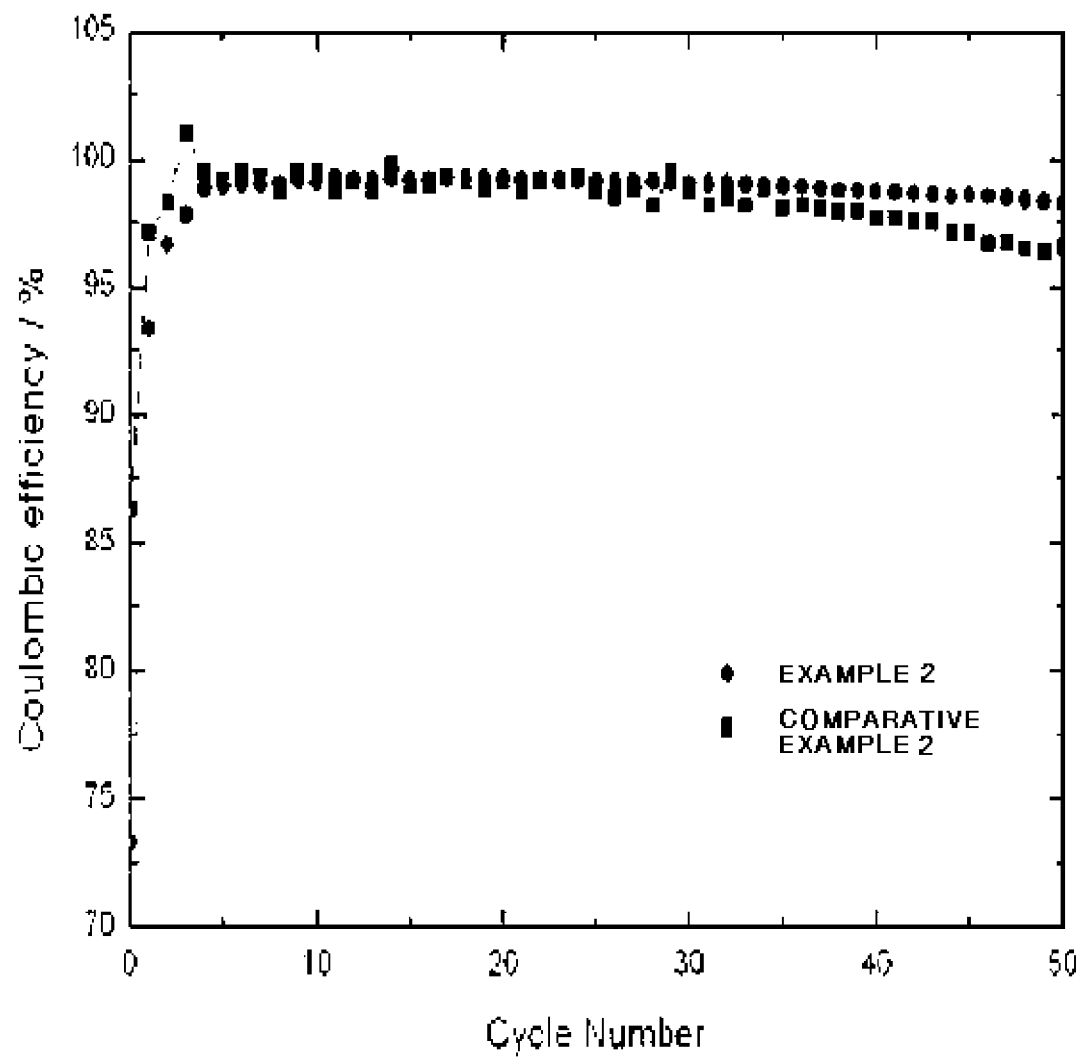

As a result, as shown in FIG. 4A, the silicon thin film anode (example 2) having carbon coated thereon showed an initial discharge capacity of 0.40 mAh, which was smaller than that of the silicon thin film anode having no carbon coated thereon (comparative example 2). However, the silicon thin film anode (example 2) showed an excellent cycle performance not causing a capacity decrease while cycles are repeated up to 50 times, and also showed an excellent cycle efficiency close to 100% as shown in FIG. 4B.

The silicon thin film anode having no carbon coated thereon (comparative example 2) showed an initial discharge capacity of 0.61 mAh. However, the initial discharge capacity drastically decreased as cycles are repeated. Furthermore, the silicon thin film anode having no carbon coated thereon showed a decreased efficiency after 40 cycles, while it initially showed a cycle efficiency close to 100%.

EXAMPLE 3

In the example 3, a metallic buffer layer was not formed, and an anode active material layer was formed of a silicon-metal single layer to undergo an annealing process.

More concretely, silicon and titanium were simultaneously deposited on a collector formed of copper by using a silicon target and a titanium target, thereby depositing an anode active material layer (silicon-metal single layer) having a thickness of 500 nm. Then, the deposited silicon thin film anode underwent an annealing process and a carbon coating process in the same manner as the example 1, thereby performing a half cell assembly. When the anode active material layer was formed of a silicon-metal single layer, a metallic component was distributed into a silicon thin film uniformly enough to approximately correspond to an alloy. Accordingly, conductivity lowering due to volume change of the silicon thin film was minimized. That is, even if the silicon thin film was broken, a conductivity of the silicon thin film anode 1 was maintained as a level more than a predetermined level.

COMPARATIVE EXAMPLE 3

In the comparative example 3, a silicon thin film anode was prepared by omitting only the annealing process performed in the example 3. That is, a silicon thin film anode having no carbon coated thereon, and having no interface stabilizing layer was formed. Then, a half cell assembly is performed in the same manner as the comparative example 1.

In order to compare the example 3 with the comparative example 3 in the aspects of a performance and cycle characteristics, charging and discharging experiments were performed in the same manner as the example 1 and the comparative example 1.

Figure 5A:
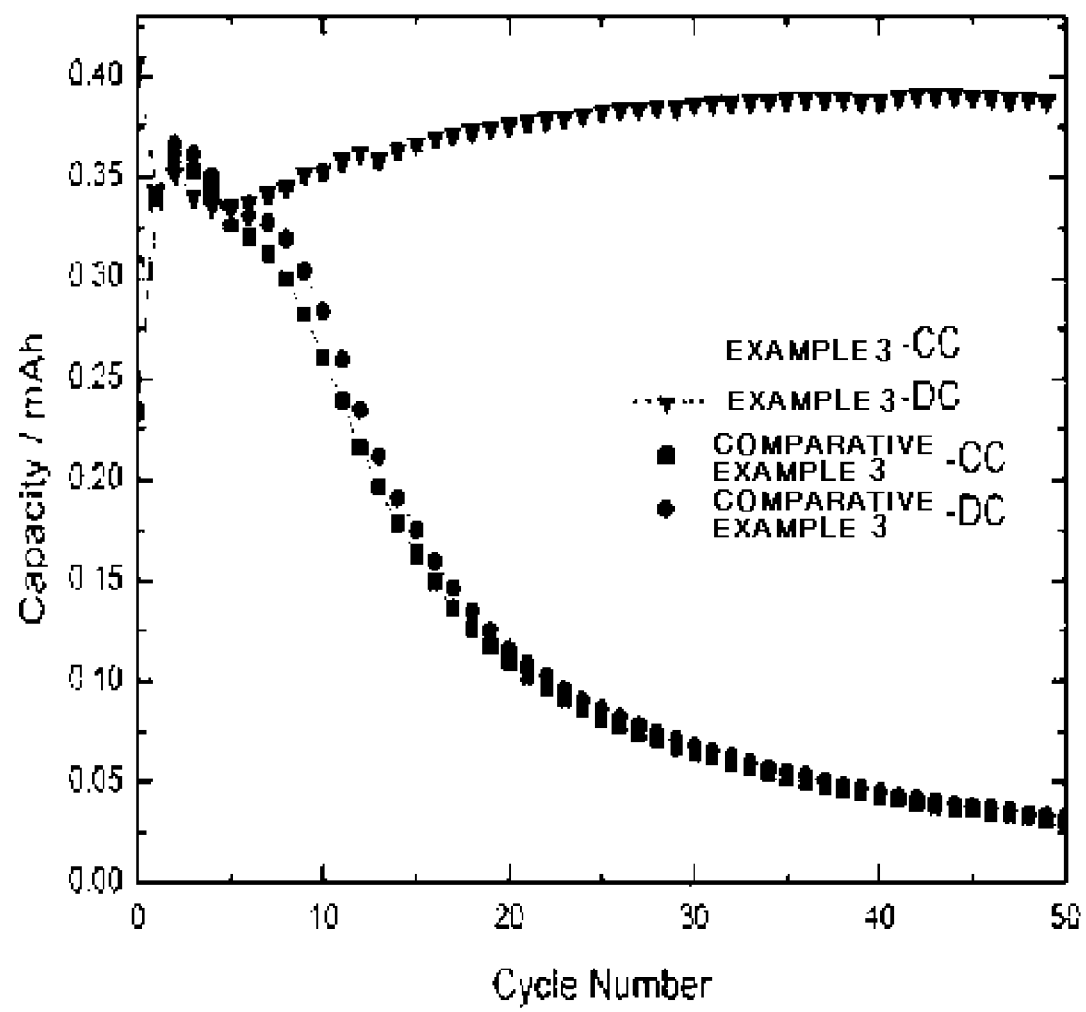
FIGS. 5A and 5B are graphs comparing cycle characteristics and efficiency of a silicon thin film anode prepared according to an example 3 to those of a silicon thin film anode prepared according to a comparative example 3.
Figure 5B:
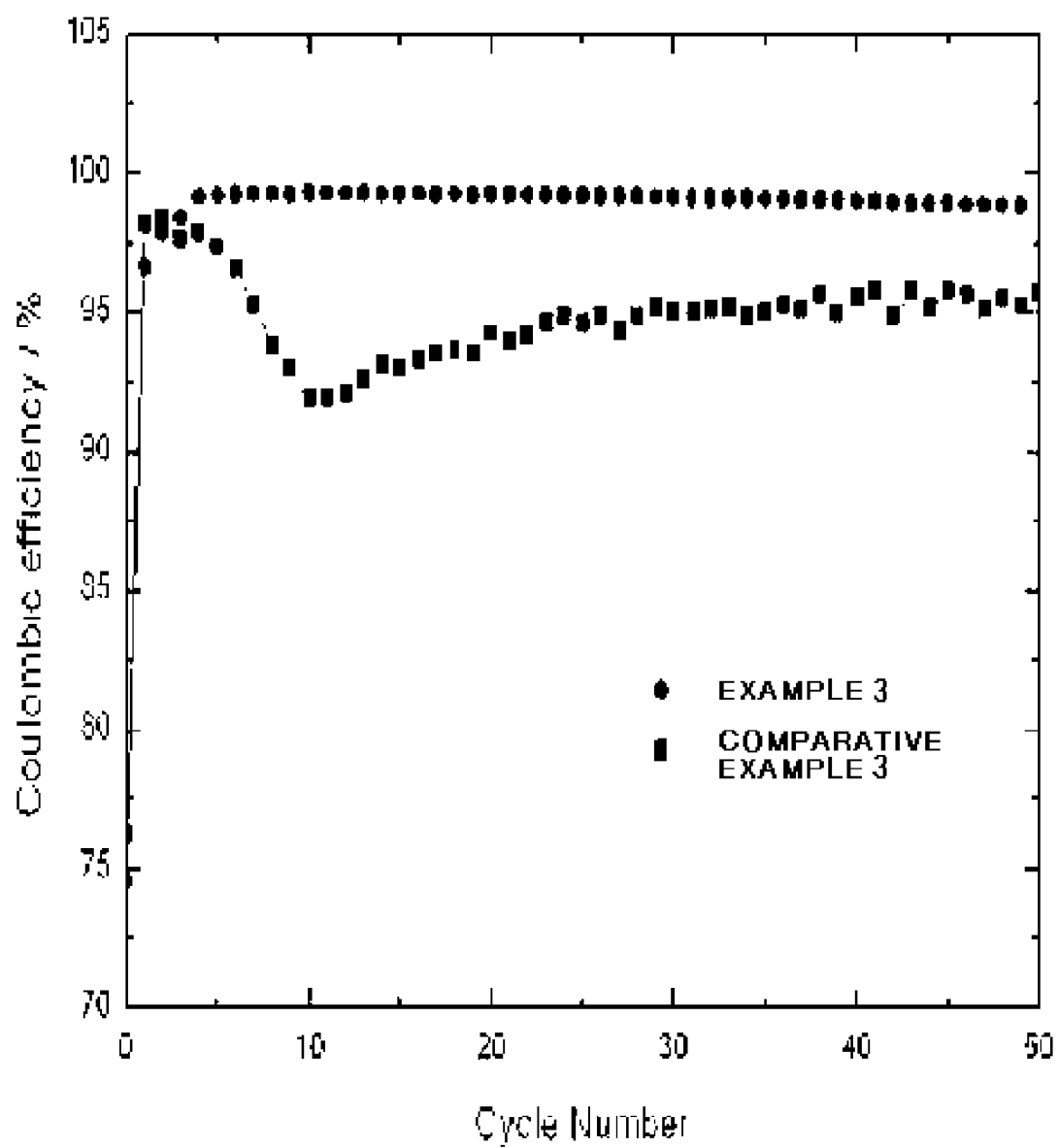

As a result, as shown in FIG. 5A, the silicon thin film anode (example 3) having carbon coated thereon showed an initial discharge capacity of 0.34 mAh, which increased little by little as cycles were repeated. The silicon thin film anode (example 3) having carbon coated thereon also showed an excellent cycle efficiency close to 100% as shown in FIG. 5B.

The silicon thin film anode having no carbon coated thereon (comparative example 2) showed an initial discharge capacity of 0.61 mAh. However, the initial discharge capacity drastically decreased as cycles are repeated. Furthermore, the silicon thin film anode having no carbon coated thereon showed a decreased efficiency after 40 cycles, while it initially showed a cycle efficiency close to 100%.

On the contrary, as shown in FIG. 5A, the silicon thin film anode having no carbon coated thereon (comparative example 3) showed an initial discharge capacity of 0.34 mAh. However, the initial discharge capacity drastically decreased as cycles are repeated. Furthermore, as shown in FIG. 5B, the silicon thin film anode having no carbon coated thereon showed an unstable cycle efficiency.

EXAMPLE 4

In the example 4, a metallic buffer layer was formed, and an anode active material layer was formed of a silicon-metal single layer to undergo an annealing process.

More concretely, a metallic buffer layer (titanium) was deposited with a thickness of 50 nm on a collector formed of copper. Then, silicon and titanium were simultaneously deposited on the metallic buffer layer, thereby depositing an anode active material layer (silicon-metal single layer) having a thickness of 500 nm. Then, the deposited silicon thin film anode underwent an annealing process and a carbon coating process in the same manner as the example 1, thereby performing a half cell assembly.

COMPARATIVE EXAMPLE 4

In the comparative example 4, a silicon thin film anode was prepared by omitting only the annealing process performed in the example 4. That is, a silicon thin film anode having no carbon coated thereon, and having no interface stabilizing layer was formed. Then, a half cell assembly was performed in the same manner as the comparative example 1.

In order to compare the example 4 with the comparative example 4 in the aspects of a performance and cycle characteristics, charging and discharging experiments were performed in the same manner as the example 1 and the comparative example 1.

Figure 6A:
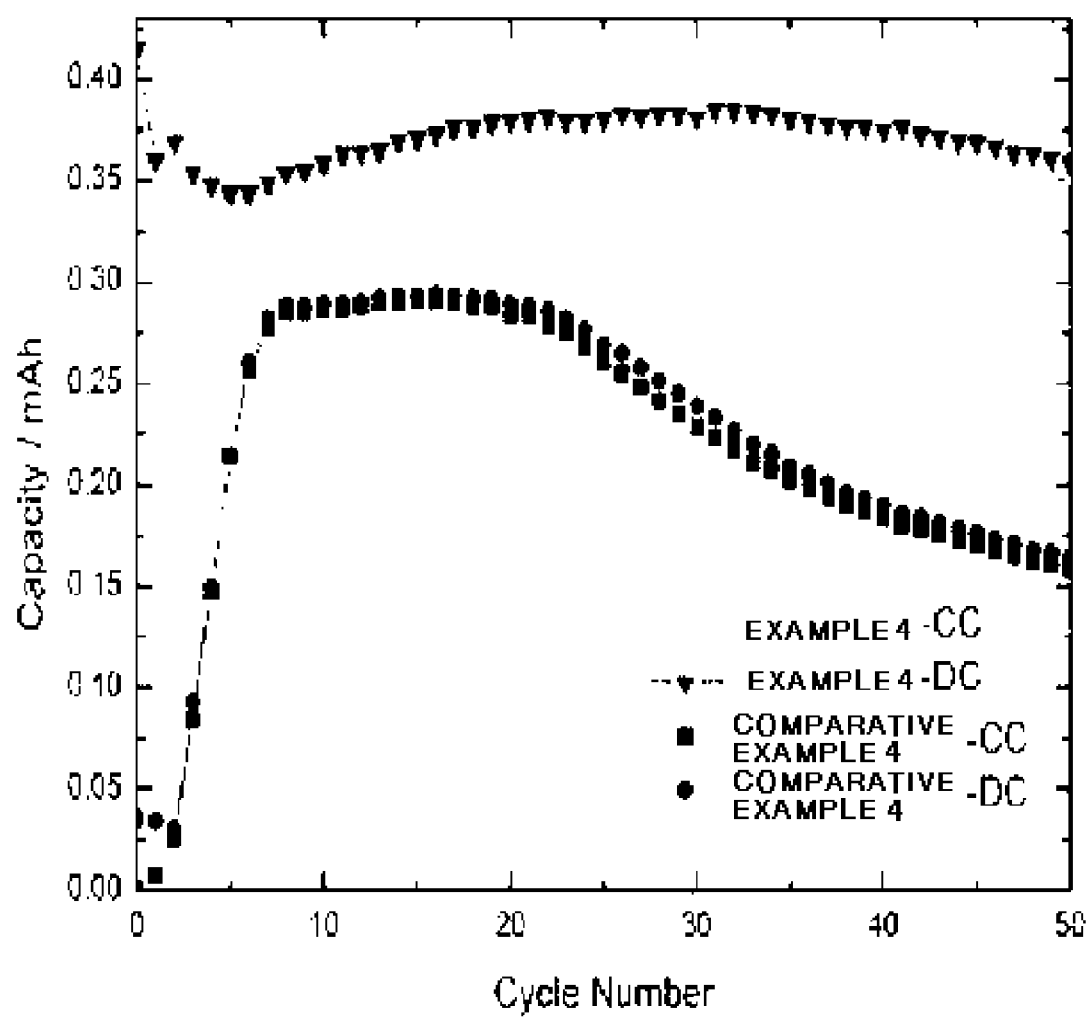
FIGS. 6A and 6B are graphs comparing cycle characteristics and efficiency of a silicon thin film anode prepared according to an example 4 to those of a silicon thin film anode prepared according to a comparative example 4.
Figure 6B:
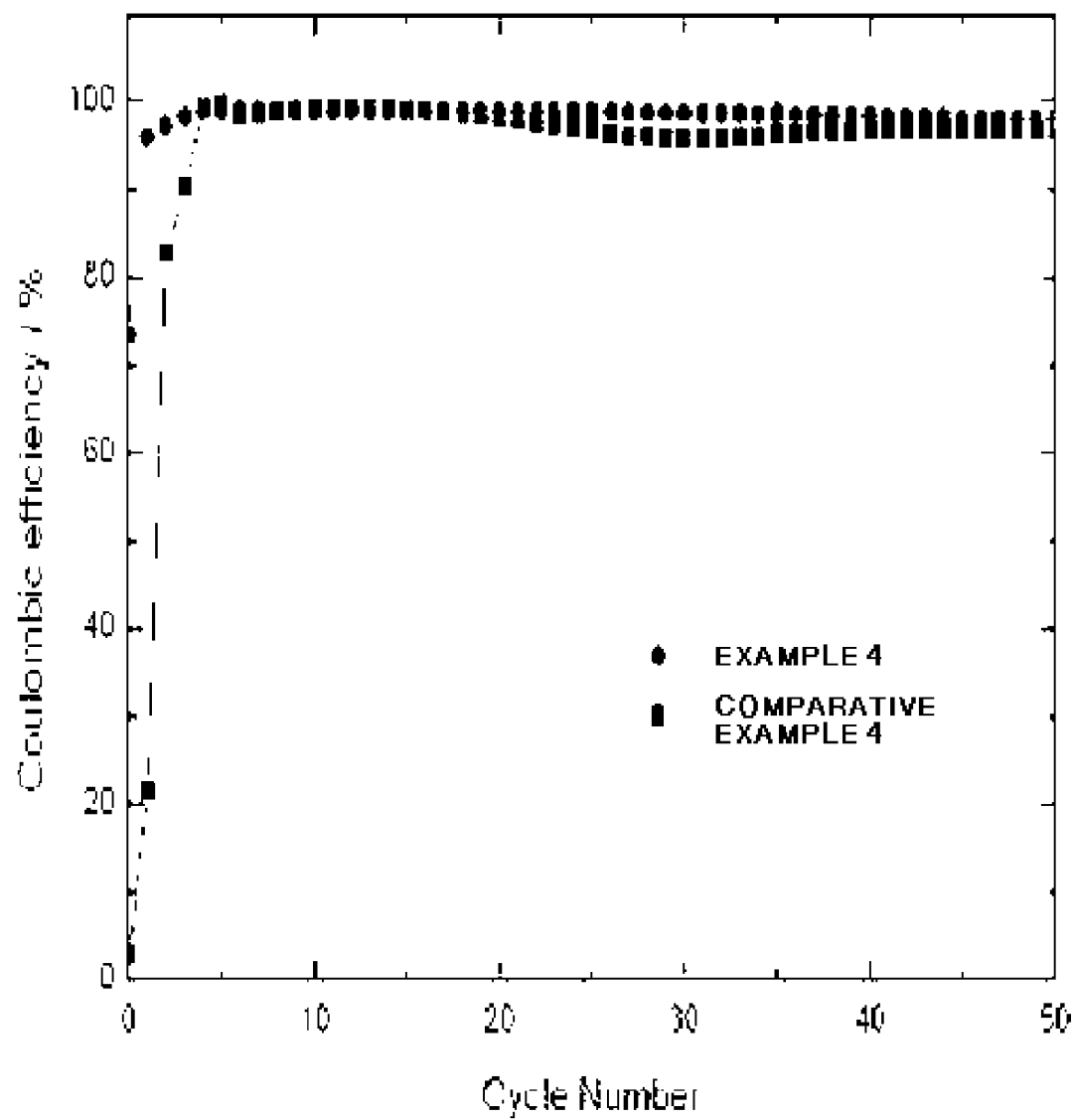

As a result, as shown in FIG. 6A, the silicon thin film anode (example 4) having carbon coated thereon showed an initial discharge capacity of 0.34 mAh, which increased little by little as cycles were repeated. The silicon thin film anode (example 4) having carbon coated thereon also showed an excellent cycle efficiency close to 100% as shown in FIG. 6B.

The silicon thin film anode having no carbon coated thereon (comparative example 4) showed an initial discharge capacity increased to 0.30 mAh while the initial 10 cycles were repeated. However, the initial discharge capacity drastically decreased as cycles are repeated. Furthermore, as shown in FIG. 6B, the silicon thin film anode having no carbon coated thereon showed a cycle efficiency close to 100%.

EXAMPLE 5

In the example 5, the same method as the example 4 except for an annealing process was used. That is, in the examples 1 to 4, the interface stabilizing layer and the carbon coating layer were respectively formed by different annealing processes. However, in the example 5, the interface stabilizing layer and the carbon coating layer were simultaneously formed by the same annealing process.

Figure 7A:
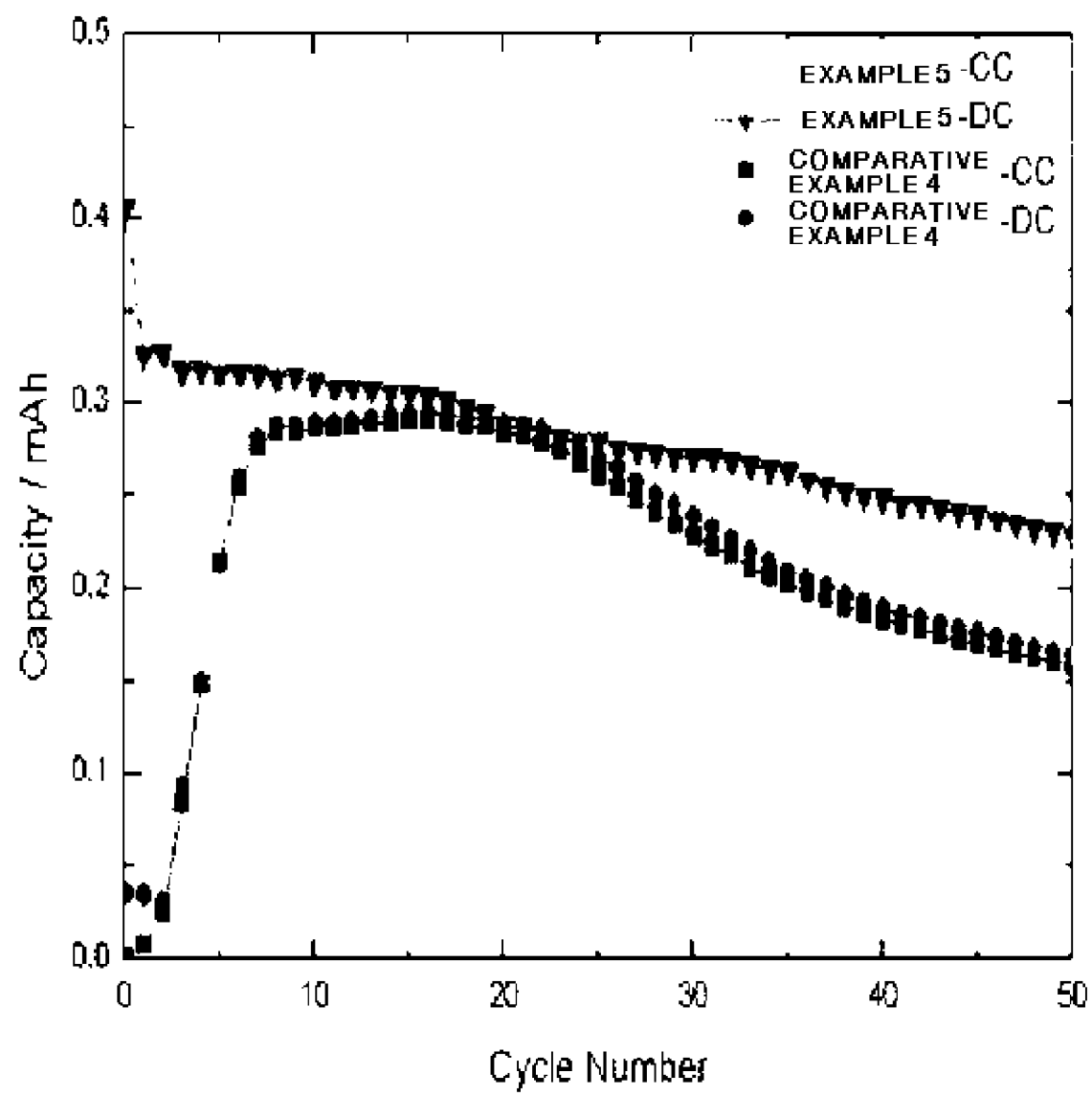
FIGS. 7A and 7B are graphs comparing cycle characteristics and efficiency of a silicon thin film anode prepared according to an example 5 to those of a silicon thin film anode prepared according to a comparative example 5.
Figure 7B:
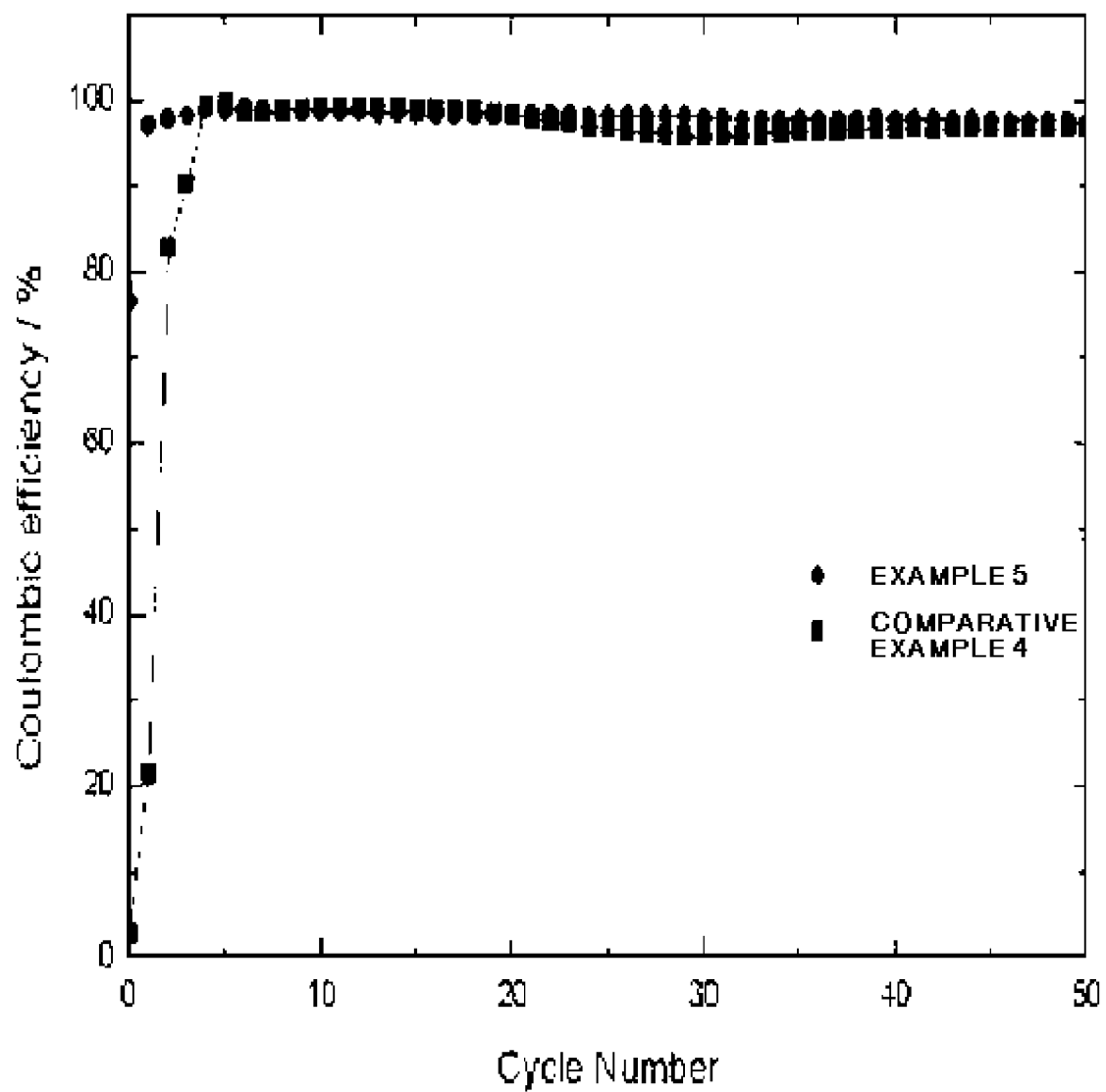

More concretely, a metallic buffer layer (titanium) was deposited on a collector formed of copper with a thickness of 50 nm. Then, silicon and titanium were simultaneously deposited on the metallic buffer layer, thereby depositing an anode active material layer (silicon-metal single layer) having a thickness of 500 nm. Then, the deposited silicon thin film anode underwent an annealing process using a rapid thermal analyzer (RTA) in a mixed hydrocarbon atmosphere that 90% argon by weight and 10% propylene by weight were mixed, thereby simultaneously forming an interface stabilizing layer and a carbon coating layer. The annealing process was performed for 20 minutes at a temperature of 400° C. having initially raised for 5 minutes. Then, the temperature of 400° C. drastically dropped to 25° C. Then, a half cell assembly was performed in the same manner as the example 1, and charging and discharging experiments were performed. As a result, as shown in FIG. 7A, the silicon thin film anode having carbon coated thereon showed an initial discharge capacity of 0.31 mAh, which showed comparatively stable cycle characteristics while cycles were repeated. As shown in FIG. 7B, the silicon thin film anode having carbon coated thereon also showed an excellent cycle efficiency close to 100%.

On the contrary, as shown in FIG. 7A, the silicon thin film anode having no carbon coated thereon (comparative example 4) showed an initial discharge capacity increased to 0.30 mAh while the initial 10 cycles were repeated. As cycles are repeated, the initial discharge capacity decreased. As shown in FIG. 7B, the silicon thin film anode having no carbon coated thereon showed a cycle efficiency close to 100%.

EFFECTS OF THE PRESENT INVENTION

As aforementioned, in the present invention, one or more interface stabilizing layers are formed between a silicon component and a metallic component in an annealing manner, and a carbon coating layer is formed on an anode active material layer in an annealing manner under a hydrocarbon atmosphere. Accordingly, the present invention provides a silicon thin film anode for a lithium secondary battery capable of enhancing a capacity and cycle characteristics by effectively controlling volume change thereof during charging and discharging, preventing a silicon thin film from being separated from a collector, and enhancing conductivity and adherence. The silicon thin film anode for a lithium secondary battery has a high output performance, a high capacity, and a long life-span.

Also, the present invention provides a preparation method for a silicon thin film anode having an enhanced function. The preparation method for a silicon thin film anode is performed in eco-friendly and simplified manners. Accordingly, silicon thin film anodes for lithium secondary batteries can be massively prepared with low costs and a high performance.

Furthermore, the present invention provides a lithium secondary battery having a silicon thin film anode of an enhanced performance.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A silicon thin film anode for a lithium secondary battery, comprising:
   a collector including a metal;
   an anode active material layer formed on the collector, and including a silicon;
   a carbon coating layer covering the anode active material layer; and
   an interface stabilizing layer formed at an interface between the metal of the collector and the silicon component of the anode active material layer,
   wherein the interface stabilizing layer comprises a silicide compound.

2. The silicon thin film anode for a lithium secondary battery of claim 1, wherein the anode active material layer is one of a silicon thin film, a silicon-metal multi-layer that a silicon thin film and a metallic thin film are sequentially laminated, a silicon-metal single layer that a silicon and a metal are simultaneously formed in one layer, and a composite layer that at least one of them is repeatedly laminated.

3. The silicon thin film anode for a lithium secondary battery of claim 2, further comprising one or more interface stabilizing layers formed at an interface between a metallic component of the anode active material layer and a silicon component of the anode active material layer by reacting the metallic component with the silicon component in an annealing manner,
wherein the interface stabilizing layer comprises a silicide compound.

4. The silicon thin film anode for a lithium secondary battery of claim 2, wherein one of the metal and the metallic thin film comprises at least one selected from a group consisting of titanium, nickel, copper, iron, chrome, manganese, cobalt, vanadium, tin, indium, zinc, gallium, germanium, zirconium, molybdenum, and antimony.

5. The silicon thin film anode for a lithium secondary battery of claim 1, further comprising a metallic buffer layer interposed between the collector and the anode active material layer, and including a metal.

6. The silicon thin film anode for a lithium secondary battery of claim 5, further comprising an interface stabilizing layer formed at an interface between a metallic component of the metallic buffer layer, and a silicon component of the anode active material layer, by reacting the metallic component with the silicon component in an annealing manner,
wherein the interface stabilizing layer comprises a silicide compound.

7. The silicon thin film anode for a lithium secondary battery of claim 5, wherein the metal comprises at least one selected from a group consisting of titanium, nickel, copper, iron, chrome, manganese, cobalt, vanadium, tin, indium, zinc, gallium, germanium, zirconium, molybdenum, and antimony.

8. The silicon thin film anode for a lithium secondary battery of claim 1, wherein the anode active material layer is formed to have a thickness of 10 nm~10 μm and the carbon coating layer is formed to have a thickness of 5 nm~200 nm.

9. The silicon thin film anode for a lithium secondary battery of claim 5, wherein the metallic buffer layer is formed to have a thickness of 5 nm~200 nm.

10. The silicon thin film anode for a lithium secondary battery of claim 1, wherein the carbon coating layer does not react with an electrolyte solution due to its amorphous structure.

11. A preparation method for a silicon thin film anode for a lithium secondary battery, comprising:
preparing a collector including a metal;
forming an anode active material layer including a silicon on the collector;
forming one or more interface stabilizing layers, by annealing the collector and the anode active material layer under one of an inert atmosphere, a reduced atmosphere, and a vacuum atmosphere to react a metallic component of at least one of the collector and the anode active material layer with a silicon component of the anode active material layer at an interface therebetween; and
forming a carbon coating layer on the anode active material layer by performing an annealing process under a hydrocarbon atmosphere.

12. The method of claim 11, further comprising forming a metallic buffer layer including a metal between the collector and the anode active material layer, before forming the anode active material layer,
wherein the interface stabilizing layer is further formed between the metallic buffer layer and the anode active material layer.

13. The method of claim 12, wherein the metallic buffer layer is formed by an RF magnetron sputtering process utilizing a metallic target,
wherein the metallic target includes at least one selected from a group consisting of titanium, nickel, copper, iron, chrome, manganese, cobalt, vanadium, tin, indium, zinc, gallium, germanium, zirconium, molybdenum, and antimony.

14. The method of claim 11, wherein the step of forming an anode active material layer is performed by at least one of:
a method for forming a silicon thin film by an RF magnetron sputtering process utilizing a silicon target,
a method for forming a silicon-metal multi-layer by forming a silicon thin film by an RF magnetron sputtering process utilizing a silicon target, and then by forming a metallic thin film by an RF magnetron sputtering process utilizing a metallic target, and
a method for forming a silicon-metal single layer by an RF magnetron sputtering process simultaneously utilizing a silicon target and a metallic target,
wherein the metallic target includes at least one selected from a group consisting of titanium, nickel, copper, iron, chrome, manganese, cobalt, vanadium, tin, indium, zinc, gallium, germanium, zirconium, molybdenum, and antimony.

15. The method of claim 11, wherein the hydrocarbon is one of ethylene, propylene, butylene, methane, ethane, propane, butane, gas composed of two or more of them, and mixed gas obtained by mixing inactive gas to them.

16. The method of claim 11, wherein the annealing process is performed for 1 minute~24 hours at a temperature of 200° C.~900° C.

17. A preparation method for a silicon thin film anode for a lithium secondary battery, comprising:
preparing a collector including a metal;
forming an anode active material layer including a silicon on the collector; and
simultaneously forming one or more interface stabilizing layers, and a carbon coating layer on the anode active material, by annealing the collector and the anode active material layer under a hydrocarbon atmosphere to react a metallic component of at least one of the collector and the anode active material layer with a silicon component of the anode active material layer at an interface therebetween.

18. The method of claim 17, further comprising forming a metallic buffer layer including a metal between the collector and the anode active material layer, before forming the anode active material layer,
wherein the interface stabilizing layer is further formed between the metallic buffer layer and the anode active material layer.

19. The method of claim 17, wherein the step of forming an anode active material layer is performed by at least one of:
a method for forming a silicon thin film by an RF magnetron sputtering process utilizing a silicon target,
a method for forming a silicon-metal multi-layer by forming a silicon thin film by an RF magnetron sputtering process utilizing a silicon target, and then by forming a metallic thin film by an RF magnetron sputtering process utilizing a metallic target, and
a method for forming a silicon-metal single layer by an RF magnetron sputtering process simultaneously utilizing a silicon target and a metallic target, wherein the metallic target includes at least one selected from a group consisting of titanium, nickel, copper, iron, chrome, manganese, cobalt, vanadium, tin, indium, zinc, gallium, germanium, zirconium, molybdenum, and antimony.

20. The method of claim 17, wherein the hydrocarbon is one of ethylene, propylene, butylene, methane, ethane, propane, butane, gas composed of two or more of them, and mixed gas obtained by mixing inactive gas to them.

21. The method of claim 17, wherein the annealing process is performed for 1 minute~24 hours at a temperature of 200° C.~900° C.

* * * * *